US010412118B1

(12) United States Patent
Davis et al.

(10) Patent No.: US 10,412,118 B1
(45) Date of Patent: Sep. 10, 2019

(54) GROUP POLICY OBJECT MANAGEMENT OF EXTERNAL NETWORK RESOURCES

(71) Applicant: FullArmor Corporation, Boston, MA (US)

(72) Inventors: Charles A. Davis, Sugar Land, TX (US); Danny Kim, San Jose, CA (US); Michael Hilton Manlief, Lexington, MA (US); Christopher Ryan Dixson-Boles, Montgomery Center, VT (US)

(73) Assignee: FullArmor Corporation, Boston, MA (US)

( * ) Notice: Subject to any disclaimer, the term of this patent is extended or adjusted under 35 U.S.C. 154(b) by 0 days.

(21) Appl. No.: 16/291,946

(22) Filed: Mar. 4, 2019

(51) Int. Cl.
*H04L 29/06* (2006.01)
*H04L 12/66* (2006.01)
*H04L 29/08* (2006.01)

(52) U.S. Cl.
CPC .............. *H04L 63/20* (2013.01); *H04L 12/66* (2013.01); *H04L 63/102* (2013.01); *H04L 63/104* (2013.01); *H04L 67/10* (2013.01)

(58) Field of Classification Search
CPC ....... H04L 63/20; H04L 63/102; H04L 67/10; H04L 63/104; H04L 12/66
See application file for complete search history.

(56) References Cited

U.S. PATENT DOCUMENTS

| 6,466,932 | B1* | 10/2002 | Dennis | G06F 21/10 707/694 |
| 8,935,365 | B1* | 1/2015 | Levin | G06F 21/604 709/220 |
| 10,021,124 | B2* | 7/2018 | Oliphant | G06F 21/57 |
| 2004/0204949 | A1* | 10/2004 | Shaji | G06F 11/1415 717/174 |
| 2004/0215649 | A1* | 10/2004 | Whalen | G06F 8/10 |
| 2006/0190985 | A1* | 8/2006 | Vasishth | G06F 21/604 726/1 |
| 2007/0124797 | A1* | 5/2007 | Gupta | H04L 63/102 726/1 |
| 2007/0209076 | A1* | 9/2007 | Porter | G06F 21/52 726/25 |
| 2011/0099605 | A1* | 4/2011 | Cha | H04W 12/06 726/3 |

(Continued)

*Primary Examiner* — Darren B Schwartz
(74) *Attorney, Agent, or Firm* — Schwegman Lundberg & Woessner, P.A.

(57) ABSTRACT

An Active Directory Bridge (AD Bridge) provides the ability to register, represent, and manage external network resources on an internal network using Group Policy Objects (GPOs). The AD bridge provides the ability to create GPOs in native Active Directory, where the settings are managed within the GPO and can be associated with Active Directory Organizational Units. The AD bridge provides the ability to manage, monitor, and enforce these settings for external cloud resources by Group Policy. The GPOs may be read from the Domain Controller (e.g., Sysvol) by the AD bridge, then translated and delivered to the cloud resource being managed. As GPOs are updated and deployed, the settings are detected and delivered to the cloud resource. When the cloud resource settings are changed outside of the GPO, the AD bridge monitors and reacts to any changes, making Group Policy the enforcement mechanism for the cloud resources.

17 Claims, 6 Drawing Sheets

(56) References Cited

U.S. PATENT DOCUMENTS

2014/0040979 A1* 2/2014 Barton .................. H04L 63/20
                                              726/1
2015/0188949 A1* 7/2015 Mahaffey ............... H04L 63/20
                                              726/1

* cited by examiner

GROUP POLICY OBJECT MANAGEMENT OF EXTERNAL NETWORK RESOURCES

TECHNICAL FIELD

Embodiments of the present disclosure relate generally to enterprise computing resources and, more particularly, but not by way of limitation, to a resource access system, method, and networking protocols for enabling external network access to enterprise computing resources residing in an internal network.

BACKGROUND

Computing resources, such as file servers, printers, intranet devices, and email servers live in a secure corporate network (e.g., a corporation's enterprise "intranet," or internal network) that may be managed via a directory service such as ACTIVE DIRECTORY® ("AD") (Microsoft Corporation, Redmond Wash.). Some directory services such as AD handle resource discovery, authentication, and management of enterprise computing resources and users. Internet-based services (e.g., cloud services) and internet-connected mobile devices (e.g., cloud-connected mobile devices) that run outside the corporate network have limited options on ways to connect back into an internal premise domain. Currently, the most common way to do this is via a Virtual Private Network (VPN) setup between the cloud service or client that is outside the network and a server inside the corporate network. A VPN allows two services to communicate via a single dedicated tunnel. However, each VPN setup adds complexity through configuration and maintenance, and a VPN may be impractical or to install or use on various devices. What is needed is an improved solution for connecting back into an internal premise domain.

BRIEF DESCRIPTION OF THE DRAWINGS

To identify the discussion of any particular element or act, the most significant digit or digits in a reference number refer to the figure number in which that element is first introduced. Further, like numbers indicate like components.

DETAILED DESCRIPTION

Figure 1:
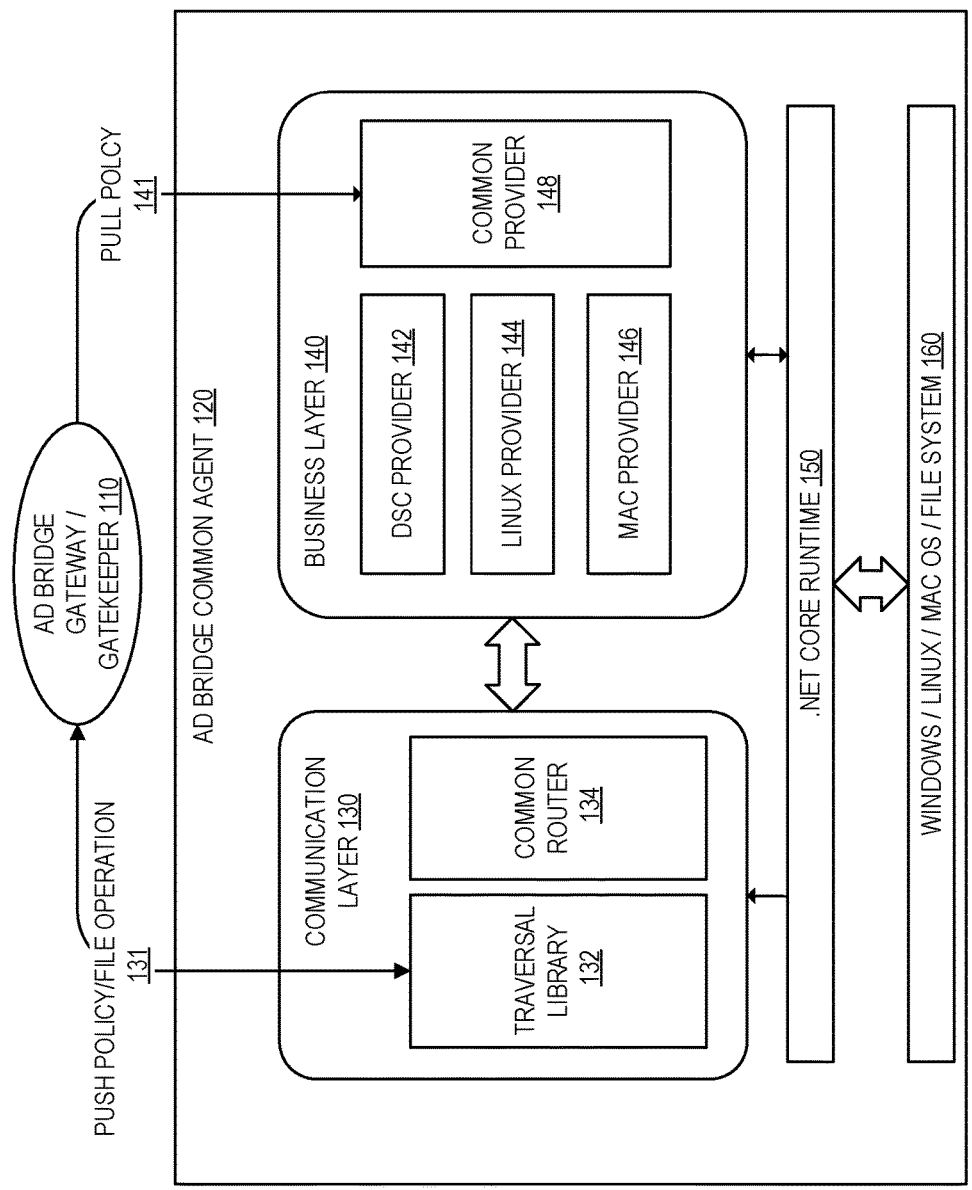
FIG. 1 is a block diagram depicting an AD Bridge topology, according to an embodiment.

An Active Directory Bridge (AD Bridge) provides the ability to register, represent, and manage external network resources on an internal network using Group Policy Objects (GPOs). This AD Bridge GPOs provides technical solutions for the technical problems facing management of external network resources connected to an internal network. Many types of external network resources may be unable to communicate directly with an internal network or directly join the internal network. The external network resources may include cloud resources, such as Internet of Things (IoT) devices, Software-as-a-Service applications (SaaS apps), cloud-hosted virtual machines (VMs), cloud-hosted computers, and other networked cloud resources. The external network resources may be unable to communicate directly with or join the internal network due to various network connection obstacles, such as Active Directory authentication requirements, firewall configurations, company information technology (IT) policies, or other network connection obstacles. The AD Bridge GPOs described herein provides the ability to manage these external network resources on an internal network.

The AD Bridge includes an AD Bridge Gateway, an AD Bridge Gatekeeper, and an AD Bridge Agent. The AD Bridge Gateway resides on a domain-joined server inside the internal network, and serves AD Bridge operations through the AD Gatekeeper to the AD Agent. The AD Bridge Gatekeeper resides external to the internal network (e.g., domain network), and provides routing services between the AD Bridge Gateway and the AD Bridge Agent. The AD Bridge Agent resides on each external network resource, and provides the connection of the host external network resource through the AD Bridge Gatekeeper and through the AD Bridge Gateway to the internal network. Each of the AD Bridge Gateway, AD Bridge Gatekeeper, and AD Bridge Agent may reside on physical or logical devices, and may be referred to as a Gateway device, a Gatekeeper device, and an Agent device, respectively.

The AD Bridge GPOs provide the ability to represent and manage these external network resources on the internal network as local or native computers, devices, or applications, such as within an Active Directory domain or within organizational units. To represent and manage these external network resources, the AD Bridge provides bi-directional communication and secure delivery of data between the internal domain and the external network resources. By representing these external network resources as native devices and applications, the AD Bridge GPOs provide the ability to manage these resources as part of a domain, which allows for centralized management of otherwise independent and disconnected devices and applications.

The AD Bridge further provides the ability to create, manage, and deploy GPOs and their collections of settings to non-Windows cloud resources via Native Active Directory or Group Policy. The non-Windows cloud resources may include IoT devices, SaaS apps, cloud-hosted VMs, cloud-hosted computers, and other non-Windows cloud resources. By representing these non-Windows cloud resources as native devices and applications in Active Directory, the AD Bridge GPOs provides the ability to manage these non-Windows cloud resources as part of the domain, allowing for centralized management of these otherwise independent and disconnected non-Windows devices.

The AD Bridge provides the ability to create GPOs in native Active Directory, where the settings are managed within the GPO and can be associated with Active Directory Organizational Units. The AD Bridge GPOs provide the ability to manage, monitor, and enforce these settings for external cloud resources by Group Policy, just as internal resources are typically managed, monitored, and enforced by Group Policy. The GPOs may be read from the Domain Controller (e.g., Sysvol) by the AD Bridge, then translated and delivered to the cloud resource being managed. As GPOs are updated and deployed, the settings are detected and delivered to the cloud resource. When the cloud resource settings are changed outside of the GPO, the AD Bridge detects the changes, reports on the changes, and may roll back the settings to the desired settings within the GPO, making Group Policy the enforcement mechanism for the cloud resources.

There are multiple limitations to known approaches when dealing with cloud services and remote computing resources, such as the need for lightweight connection pooling and dynamic switching, and the heavy requirements on the client and server sides for specialized software and handshake in order to orchestrate a secure connection. Known Virtual Private Network (VPN) solutions often require dedicated hardware, where connections for each user may be opened and maintained even when not actively in use. Because cloud services are transient and often require minimal prerequisites, there is a need for a mechanism that can address the dynamic nature of a secure cloud to on-premise connection and resource sharing along with the minimal infrastructure requirements of being accessible via a simple web browser, heterogeneous cloud connected mobile device or via well-established web-based APIs.

Further, in some situations, users may work around the limitations of known systems. For example, a user wanting to access files on their intranet may copy their files to an external environment, such as an Internet-based file hosting service, in order to have access to their files while outside the enterprise intranet. This practice is sometimes referred to as "shadow IT," where users become their own Information Technology (IT) department by employing alternate systems, solutions, or applications that circumvent architectural or security limitations of their existing enterprise IT systems. These unsanctioned workarounds can cause many problems such as security issues (e.g., unauthorized access to the data, data breach), data control issues (e.g., inability for the business entity to revoke access to the data for terminated employees), and version control issues (e.g., no synchronization between the multiple copies), to name but a few. If users had sufficient access to the internal resources, such problems could be avoided.

A Resource Access System, method, and associated protocols are described herein for addressing these technical problems by providing external network-based access to computing resources within a protected network (e.g., internal servers or systems within an intranet network of a business entity). In other words, and for example, the Resource Access System enables computing devices outside of an enterprise network (e.g., Internet-based devices such as users' smartphones or remote computing devices) to access internal computing resources ("intranet components" or "on-premise resources") within the enterprise network. The enterprise environment may provide many internal computing resources, components, or systems, to its employees. These intranet components may, for example, be managed by a directory service such as ACTIVE DIRECTORY® ("AD") (Microsoft Corporation, Redmond Wash.). An AD domain controller provides authentication and authorization services for users of the network (e.g., employees), such as providing username and password authentication for internal servers, personal computers, and other intranet computing resources.

For example, an employee (e.g., the "user") may have access to their own personal share (e.g., directory of files, the internal resource or component), or a database-driven application accessing an internal database resource, when logged into their work computer on the enterprise intranet. As such, the user may authenticate and authorize use of the internal resource (e.g., their share, or the internal database) through an AD domain controller, also within the intranet network. However, AD services may be inhibited for devices or applications outside of that enterprise's intranet, and perhaps for some device types not typically joined to the directory service (e.g., smartphones, tablets), making remote access to directory services unavailable or unusable to those devices. Further, enterprise application ("app") developers may wish to leverage the advantages of Internet cloud-based app deployment (e.g., lower cost, greater scalability, externally accessible) when developing new apps, or may wish to migrate existing non-cloud-based apps to the cloud. As such, the business entity may develop cloud-based apps for use by the employee while remote (e.g., when the user is away from the business premises, such as via an Internet-based cloud service). Accordingly, it may be advantageous to provide access to the internal computing resource through the external app or to the external or "endpoint" device (e.g., access to the employee's share on the employee's mobile device). The term "endpoint" is used herein, for purposes of convenience, to refer to the external application or the external device (e.g., from the Internet) which is to be the consumer of the internal computing resources (i.e., to which access is sought) through the Resource Access System described herein.

The Resource Access System ("RAS") performs pass-through authentication and impersonation provide external access to internal computing resources of the enterprise. In some example embodiments, the RAS includes at least two devices: a gatekeeper and a resource gateway (e.g., "gateway"). The gatekeeper acts as the first point of contact for the endpoint when initiating access to the internal resource(s), and in some embodiments, a router for subsequent traffic from the endpoint to the resource gateway. The gatekeeper resides within the external cloud or other eternal network (e.g., the Internet) and has network connectivity to endpoint devices of the users or external applications such as the cloud apps. Further, the gatekeeper has network connection capability enabled to the resource gateway, which resides in the internal network (e.g., the intranet), as well as perhaps other resource gateways (e.g., each supporting different domains, or different intranets). For incoming API requests, the gatekeeper determines which resource gateway is the target of the API request and forwards the API request accordingly. As such, the gatekeeper is able to support multiple resource gateways.

The resource gateway acts on behalf of the endpoint to facilitate access to internal resources, such as AD domain servers, server systems, databases, file shares, and so forth. The resource gateway provides access to internal resources for the endpoint. To initiate this access, the endpoint submits resource requests through to the resource gateway in the form of API calls passed to the gatekeeper or the resource gateway (e.g., as Representational State Transfer (REST) API calls via Hypertext Transfer Protocol (HTTP/S), and optionally JavaScript Object Notation (JSON) messages). More specifically, when the endpoint initiates resource request operations (e.g., via API calls), the resource gateway authenticates with an internal directory service (e.g., an AD domain controller) as the user (e.g., with credentials of the user), in order to access the internal resources on behalf of the external endpoint. In other words, the resource gateway pretends to be the user in order to perform access request operations to the internal resource, similar to how the user would were they connected to the intranet and authenticating with the directory service directly. As such, the resource gateway appears to the AD domain server to be the user, and the internal directory service responds to the operations submitted by the gateway as such.

To enable endpoint communication with the gateway, in some embodiments, the endpoint includes an API client configured with a suite of application program interface ("API") commands for various resource types (e.g., printers, file shares, databases, and so forth), and for various resource requests (e.g., different operations for the given resource type). The API commands, or "API calls," serve as a message submission format through which the endpoint or app may initiate requests for access to the internal resources. In other words, each type of internal resource may have a set of API calls defined, where each API call defines a particular operation appropriate for that internal resource.

To perform resource operations on behalf of the external user, the gateway includes one or more "resource controllers" for the various types of internal resources supported by the gateway. For example, the gateway may include a database controller (e.g., for performing operations with internal databases), a share controller (e.g., for performing file-level operations with users' shares), a printer controller, and so forth. Each of these controllers is customized to perform one or more resource operations with the associated resource type (e.g., as also defined by the API operations for that resource type). Each of the API operations includes a "resource type" and a "resource operation" (as well as additional operational parameters), where the resource type may be used to identify a particular controller, and where that particular controller is configured to perform each of the various resource operations for that resource type. For purposes of discussion, the nomenclature used herein to identify particular operations is "API-<resource type>-<resource operation>," where <resource type> identifies the resource type (and associated controller), and where <resource operation> identifies the operation to be performed (e.g., on a resource of that <resource type>). For example, the operation "API-share-download" indicates a "download" operation on a "share" type resource (e.g., downloading a file from a particular share).

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"GATEWAY" in this context refers to a computing device, application, or system that performs operations as described herein, and not strictly operations associated with typical network gateways. Typical network gateways enable the passing of network traffic between multiple networks, sometimes performing network protocol conversion or translation between two different protocols. Typical proxy devices, applications, or systems act as an agent, or a substitute actor for performing an operation on behalf of another. The term gateway, as used herein, is not meant to limit the operations of the described devices, applications, or systems to that of a typical network gateway. Rather, the gateways described herein may perform operations similar to network gateways, proxies, or any other operations as described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a block diagram depicting an AD Bridge topology 100, according to an embodiment. The AD Bridge topology 100 may include an AD Bridge Gateway/Gatekeeper 110 inside a network, and an AD Bridge common Agent 120 outside the network. The AD Bridge common Agent 120 may be outside the network, and at least a portion of the AD Bridge Gateway/Gatekeeper 110 may be cloud-based or within a demilitarized zone (DMZ) (e.g., screened subnet, perimeter network) of a network. The AD Bridge Gateway/Gatekeeper 110 may include a multi-tenant routing service provider serving the AD Bridge Gateway/Gatekeeper 110 and one or more AD Bridge common agents 120. In an embodiment, the AD Bridge Gateway/Gatekeeper 110 may run on a domain-joined Windows server inside a domain network, where the AD Bridge Gateway/Gatekeeper 110 runs a service using privileged account settings, such as administrator or service account with elevated privileges.

The AD Bridge common Agent 120 may be used to connect the host (e.g., host machine, host device, host OS) to the AD Bridge environment via the AD Bridge Gateway/Gatekeeper 110. The AD Bridge common Agent 120 can run on various operating systems, such as Windows, Linux, UNIX, Mac OS, VM, or container. The AD Bridge common Agent 120 may include a communication layer 130, where the communication layer 130 includes a traversal library 132 and a common router 134. The communication layer may be used via a push policy or file operation 131 with the AD Bridge Gateway/Gatekeeper 110 to keep the communication alive through one or more firewalls, such as using NAT traversal. The AD Bridge common Agent 120 may include a business layer 140, where the business layer may include a DSC provider 142, a Linux provider 144, a Mac OS provider 146, and a common provider 148. The common provider 148 may rationalize requests with the other providers 142-146, such as via a pull policy 141 with the AD Bridge Gateway/Gatekeeper 110. The communication layer 130 and business layer 140 may communicate with a .NET core runtime 150, which in turn communicates with the host file system 160, such as a Widows file system, Linux file system, or Mac OS file system.

Figure 2:
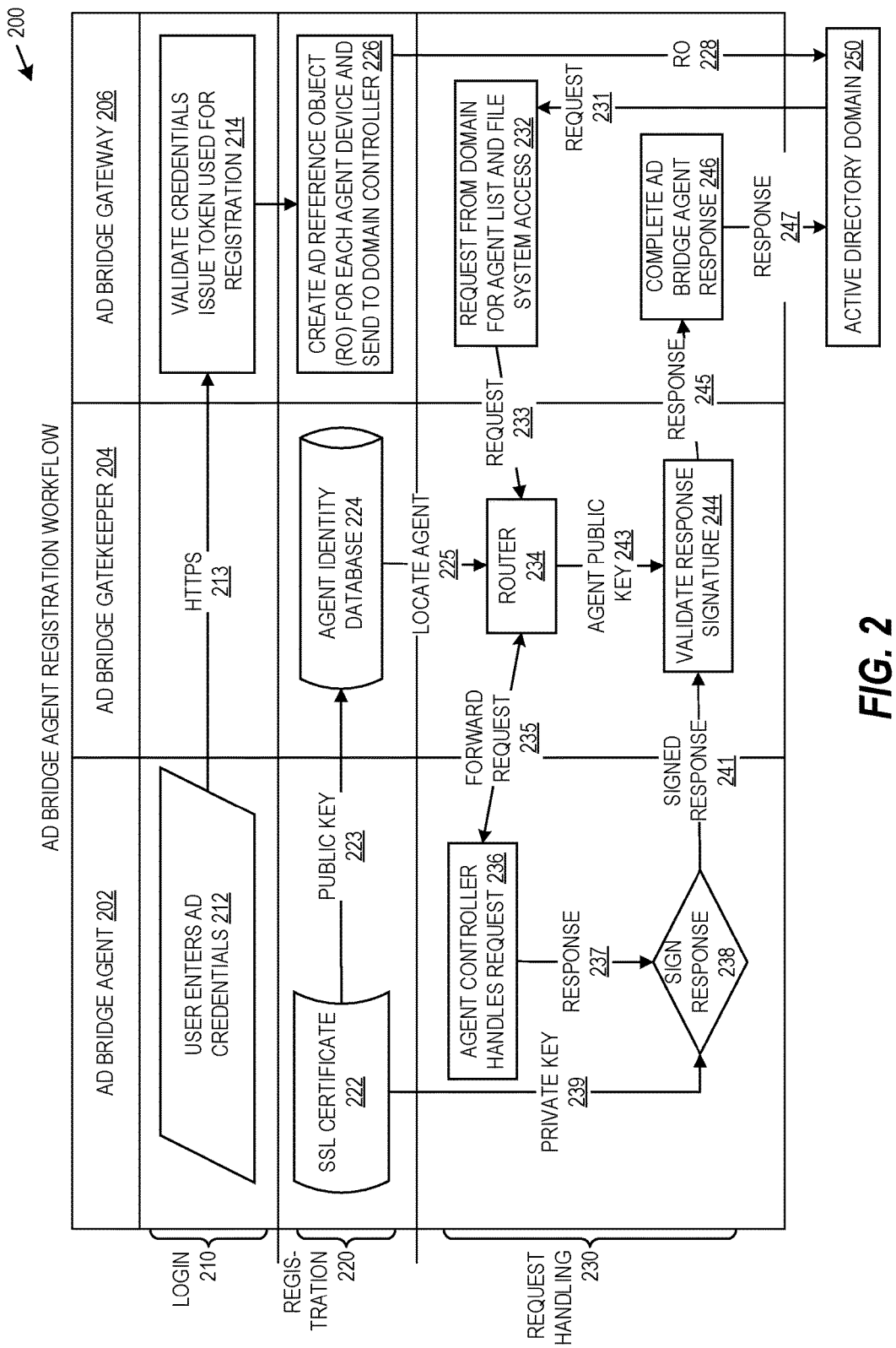
FIG. 2 is a block diagram depicting an AD Bridge Agent registration workflow, according to an embodiment.

FIG. 2 is a block diagram depicting an AD Bridge Agent registration workflow 200, according to an embodiment. Workflow 200 includes operations on various platforms, such as an AD Bridge Agent 202, an AD Bridge Gatekeeper 204, and an AD Bridge Gateway 206. In an embodiment, Agent 202 runs in the cloud, Gatekeeper 204 runs in the cloud or on-premise, and Gateway 206 runs on-premise. The Gateway 206 may be in communication with the Gatekeeper 204 through one or more network perimeter devices (not separately shown), such as a firewall device (e.g., a device that prohibits some network traffic but allows other traffic). Workflow 200 may include various groups of operations, such as login 210, registration 220, and request handling 230. Login 210 may include a user entering AD credentials 212, such as during installation of the AD Bridge. The credentials may be shared via HTTPs 213 from Agent 202 via Gatekeeper 204 to Gateway 206, where the credentials are validated and a token is used for registration 214. An AD reference object (RO) is created for each Agent device and sent 226 to domain controller 250. A request 231 is made from the domain to the Gateway 206 for Agent list and file system access 232. The request 233 may be forwarded from the Gateway 206 to a router 234 on Gatekeeper 204. The request may be forwarded 235 to an Agent controller 236 on Agent 202, which forwards a response for response signing 238. A SSL certificate 222 may be generated by Agent 202, which provides a private key 239 for response signing 238. A public key 223 may also be provided to an Agent identity database 224 on Gatekeeper 204, which provides locate Agent information 225 to router 234. Router 234 may provide an Agent public key 243, which may be combined with a signed response 241 to validate response signature 244. Once validated, a response 245 may be provided to the Gateway 206 completing the AD Bridge Agent response 246. A response 247 may be sent from the Gateway 206 to the Active Directory domain 250.

In an embodiment, the AD Bridge Gatekeeper 204 is deployed on a Gatekeeper device, and subsequently the AD Bridge Gateway 206 is installed internally on a domain-joined Windows server, where the AD Bridge Gateway 206 runs a web service to provide access via representational state transfer (REST) application programming interfaces (APIs). The AD Bridge Gateway 206 registers with the AD Bridge Gatekeeper 204 to establish a communication path, where the communication path does not use or require a VPN. Once the communication path is established, the AD Bridge Gateway 206 is now able to communicate directly with the internal domain controller. In an embodiment, the AD Bridge Gateway 206 may run with elevated privileges. Now that the AD Bridge Gateway 206 and AD Bridge Gatekeeper 204 are running and have a trust relationship established for communication, one or more external AD Bridge agents 202 can be installed and configured using AD virtual joining, such as described further below.

The AD Bridge Agent 202 may be installed running as a service with credentials from the internal domain. The authentication of the service may use authentication described in U.S. Pat. No. 9,450,944 entitled "System and Method for Pass-Through Authentication," or using authentication described in U.S. Pat. No. 9,509,684 entitled "System and Method for Resource Access with Identity Impersonation," the contents of which are hereby incorporated by reference in their entirety. The authentication enables the Agent 202 to register and establish a trust relationship with the Gatekeeper 204 and Gateway 206 associated with that customer domain.

Once the Agent 202 is authenticated and registered with the Gatekeeper 204 and Gateway 206, the Agent 202 can now access internal resources. Internal resource access may be provided as described in U.S. Pat. No. 9,762,563 entitled "Resource Access System and Method," the contents of which are hereby incorporated by reference in their entirety. The Agent 202 may initiate the Gateway 206 to generate a "share" representing each Agent, and then publish the generated shares to the domain controller. This generation and publication of shares establishes bi-directional access of resources between the internal domain and the Agent 202 through the Gateway 206, such as via REST API calls. This allows the Agent OS and file system to be accessed and managed from native internal AD tools as if it were a locally joined AD device or service. In various embodiments, this design allows for various numbers of gatekeepers 204 and gateways 206, such as many-to-one Gateway 206 to Gatekeeper 204 or many-to-one Agent 202 to Gateway 206 configurations.

Once the workflow 200 is complete, various scenarios may be used to provide management of these external resources using native AD Group Policy, such as Agent and agentless cloud resource management. Management may provide for the translation of GPOs into a readable format by non-domain joined computers. Management may include systems or methods described in U.S. Pat. No. 8,935,365 entitled "Group Policy Framework," the contents of which are hereby incorporated by reference in their entirety. Management provides the ability to translate a GPO into a common file format that is delivered to the external Agent device, where the translated GPO may be used to implement settings or report compliance. In an embodiment, this includes provides an enforcement component in the business layer that reports to the AD indicating that the Agent is in compliance or not in compliance. The Gateway 206 and Agent 202 may handle noncompliance, where the Agent 202 may create a table that it monitors on the device, and the Agent routine will reset the settings and create an audit and alert event or create a system event for notification purposes. This may be used when a company is required to undergo an audit, and may be used to tie the notification into the security software notification. This provides the ability to manage external non-AD connected devices or services using GPOs and native Group Policy, which is distinct from solutions that simply take Group Policy objects from on-premise AD and deliver those Group Policy objects to non-AD connected devices, users, or applications from an alternative distribution point (e.g., from the cloud).

Figure 3:
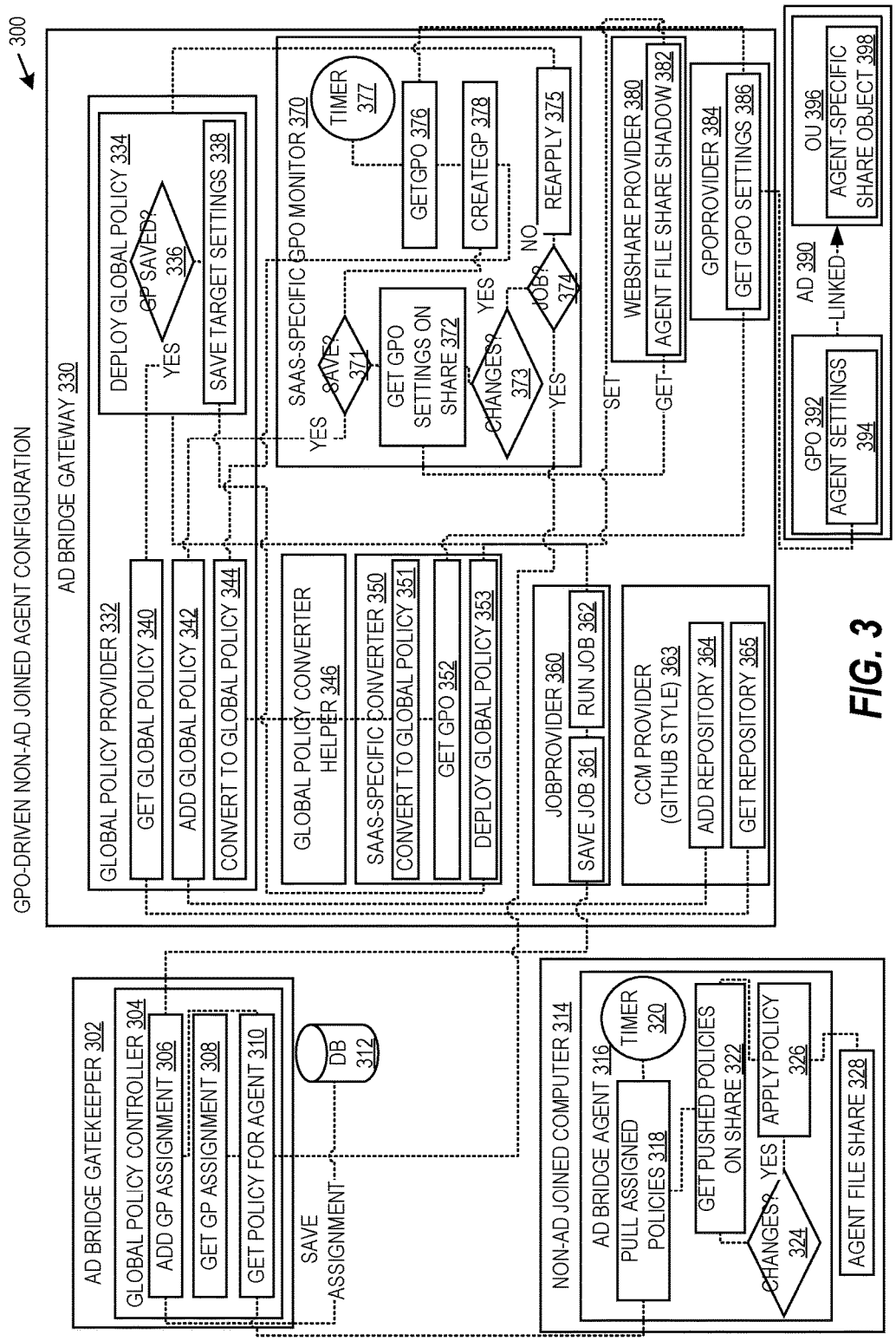
FIG. 3 is a block diagram depicting a GPO-driven non-AD joined Agent configuration 300, according to an embodiment.

FIG. 3 is a block diagram depicting a GPO-driven non-AD joined Agent configuration 300, according to an embodiment. The first Agent configuration 300 provides additional detail regarding the Agent 316, Gatekeeper 302, and Gateway 330. Once the non-AD joined computer 314 is registered, an object (e.g., share) representing the non-AD joined computer 314 may be published to a domain controller. The Gateway 330 may have a Group Policy management console (GPMC) provider 332 installed, which may provide an extension to edit a global policy editor with settings specific to the Agent OS. This provides the ability to create Group Policy Objects (GPOs) with settings and values specific to each AD Bridge Agent 316, to create organizational units (OUs) 396, and to apply the GPOs to the OUs 396 with the AD Objects representing the agents 316.

The AD Bridge Gatekeeper 302 may include a global policy controller 304. The global policy controller 304 may include the ability to add a global policy (GP) assignment 306, which may be provided to save the job 361 within a job provider 360. The global policy controller 304 may include the ability to get a GP assignment 308, which may provide a confirmation to a job 374 within a SaaS-specific GPO monitor 370. The global policy controller 304 may include the ability to get the policy for an Agent 310, which may be triggered by a command from an AD Bridge Agent 316 to pull assigned policies 317, and provide the policy to the add GP assignment 306. The add GP assignment 306 may also be used to save the assignment to one or more databases 312.

The AD Bridge Agent 316 may be implemented on a non-AD joined computing device 314. The AD Bridge Agent 317 may pull assigned policies 317 from the global policy controller 304, which may be based on a timer 320.

The AD Bridge Agent 317 may get pushed policies on share 322, determine whether there are changes 324, and apply the policy 324. The applied policy 326 may be communicated to an Agent file share 328.

The AD Bridge Gateway 330 may include a global policy provider 332. The global policy provider 332 may be used to get the global policy 340, such as in response to a CCM provider 363 request to get repository 365. The global policy provider 332 may be used to add the global policy 342, such as in response to a CCM provider 363 request to add repository 364. The global policy provider 332 may be used to convert to global policy 344, such as in response to a SaaS-specific GPO monitor 370 command to create a global policy 378. The global policy provider 332 may be used in conjunction with a global policy converter helper 346 to enable the conversion to global policy 344. The global policy provider 332 may include a deployment of global policy 334, which may receive global policy information from the get global policy 340 and determine if the global policy is saved 336, and subsequently save the target settings 338.

The AD Bridge Gateway 330 may include a SaaS-specific converter 350. The SaaS-specific converter 350 may provide a SaaS-specific converter to global policy 351. The SaaS-specific converter 350 may provide a SaaS-specific convert to GPO 352, which may be provided in response to a GPO provider 384 call to get GPO settings 386.

The AD Bridge Gateway 330 may include a job provider 360. The job provider 360 may include the ability to save a job 364, such as in response to add a GP assignment 306. The job provider 360 may include the ability to run a job 365, such as in response to a request to get the global policy 340.

The AD Bridge Gateway 330 may include a CCM provider 363. The CCM provider 363 may be in the form of a GitHub-style provider or other provider. The CCM provider 363 may include the ability to add a repository 364, which may be used to add a global policy 342. The CCM provider 363 may include the ability to get a repository 365, which may be used to get a global policy 365.

The AD Bridge Gateway 330 may include a SaaS-specific GPO monitor 370. The SaaS-specific GPO monitor 370 may include the ability to save a global policy 371 and create a global policy 378, such as in response to adding a global policy 342. The SaaS-specific GPO monitor 370 may include getting GPO settings on share 372, such as in response to an Agent file share shadow 382 from a webshare provider 380. In response to determining changes 373 in the GPO settings, the SaaS-specific GPO monitor 370 may determine a job 374 for the global policy controller 304 or may determine that the settings should be reapplied 375 for the deployment of the global policy 334. The SaaS-specific GPO monitor 370 may include a timer 377 used to determine whether to get the GPO 376, which may be used to create the GP 378 or get GPO settings 386.

The AD Bridge Gateway 330 may include a webshare provider 380. The webshare provider 380 may include an Agent file share shadow 382. The Agent file share shadow 382 may operate in response to a "get" command from get GPO settings on share 372. The Agent file share shadow 382 may provide a "set" command to get GPO 352.

An Active Directory 390 may receive GPO settings from the AD Bridge Gateway 330. The Active Directory 390 may include a GPO 392 that includes Agent settings 394 received from the AD Bridge Gateway 330. The GPO 392 may be linked to an organizational unit 396, which includes an Agent-specific object 398, such as described above.

In contrast with typical Group Policy functionality for internal domain-joined resources, the GPO-driven non-AD joined Agent configuration 300 provides the ability to join external resources (i.e., external from the internal domain) to the AD and manage them with GPOs by extending the perimeter of Active Directory beyond the domain using a REST interface bridge, all without using or requiring a VPN.

Figure 4:
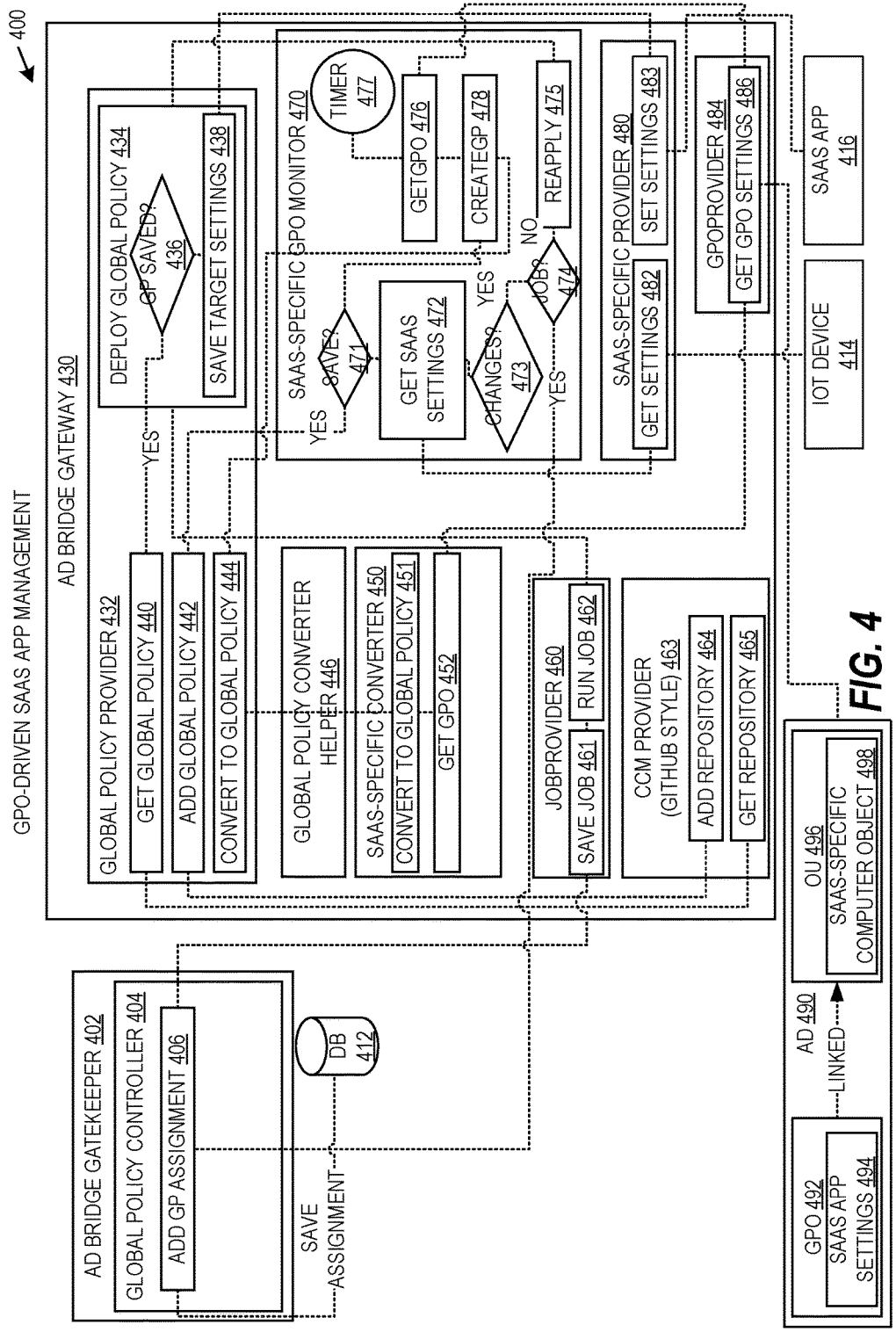
FIG. 4 is a block diagram depicting a GPO-driven SaaS app management, according to an embodiment.

FIG. 4 is a block diagram depicting a GPO-driven SaaS app management 400, according to an embodiment. GPO-driven SaaS app management 400 is similar to the GPO-driven non-AD joined Agent configuration 300 shown in FIG. 3, but provides the ability to manage devices that do not include an Agent, such as SaaS apps or IoT devices. Similar to Agent configuration 300, an object representing the IoT device 414 or SaaS app 416 is created and published to the domain controller by the AD Bridge Gateway 430. Settings are managed by a SaaS-specific provider 480, where the settings represent settings that are API-enabled on the corresponding IoT device 414 or SaaS app 416. This provides the ability to create GPOs with settings and values for these IoT device 414 or SaaS app 416 and create OUs and apply the GPOs to the OUs with the AD objects representing these external resources.

The AD Bridge Gatekeeper 402 may include a global policy controller 404. The global policy controller 404 may include the ability to add a global policy (GP) assignment 406, which may be provided to save the job 461 within a job provider 460. The add GP assignment 406 may also be used to save the assignment to one or more databases 412.

The AD Bridge Gateway 430 may include a global policy provider 432. The global policy provider 432 may be used to get the global policy 440, such as in response to a request from the change and configuration management (CCM) provider 463 to get repository 465. The global policy provider 432 may be used to add the global policy 442, such as in response to a CCM provider 463 request to add repository 464. The global policy provider 432 may be used to convert to global policy 444, such as in response to a SaaS-specific GPO monitor 470 command to create a global policy 478. The global policy provider 432 may be used in conjunction with a global policy converter helper 446 to enable the conversion to global policy 444. The global policy provider 432 may include a deployment of global policy 434, which may receive global policy information from the get global policy 440 and determine if the global policy is saved 436, and subsequently save the target settings 438.

The AD Bridge Gateway 430 may include a SaaS-specific converter 450. The SaaS-specific converter 450 may provide a SaaS-specific converter to global policy 451. The SaaS-specific converter 450 may provide a SaaS-specific convert to GPO 452, which may be provided in response to a GPO provider 484 call to get GPO settings 486.

The AD Bridge Gateway 430 may include a job provider 460. The job provider 460 may include the ability to save a job 464, such as in response to add a GP assignment 406. The job provider 460 may include the ability to run a job 465, such as in response to a request to get the global policy 440.

The AD Bridge Gateway 430 may include a CCM provider 463. The CCM provider 463 may be in the form of a GitHub-style provider or other provider. The CCM provider 463 may include the ability to add a repository 464, which may be used to add a global policy 442. The CCM provider 463 may include the ability to get a repository 465, which may be used to get a global policy 465.

The AD Bridge Gateway 430 may include a SaaS-specific GPO monitor 470. The SaaS-specific monitor 470 may include the ability to save a global policy 471 and create a global policy 478, such as in response to adding a global policy 442. The SaaS-specific monitor 470 may include getting SaaS settings 472, such as in response to an Agent file share shadow 482 from a SaaS-specific provider 480. In response to determining changes 473 in the GPO settings, the SaaS-specific monitor 470 may determine a job 474 for the global policy controller 404 or may determine that the settings should be reapplied 475 for the deployment of the global policy 434. The SaaS-specific monitor 470 may include a timer 477 used to determine whether to get the GPO 476, which may be used to create the GP 478 or get GPO settings 486.

The AD Bridge Gateway 430 may include a SaaS-specific provider 480. The SaaS-specific provider 480 may operate in response to receiving a get command from get SaaS settings 472 at get settings 482, and may provide those settings to an IoT device 414. The SaaS-specific provider 480 may operate in response to receiving a command from save target settings 438 at set settings 483, and may provide those settings to a SaaS app 416.

An Active Directory 490 may receive GPO settings from the AD Bridge Gateway 430. The Active Directory 490 may include a GPO 492 that includes SaaS application settings 494 received from the AD Bridge Gateway 430. The GPO 492 may be linked to the organizational unit 496, which includes an SaaS-specific computer object 498.

This GPO-driven SaaS app management 400 provides the ability to join IoT device 414 or SaaS app 416 external from the internal domain to the AD and manage them with GPOs by extending the perimeter of AD beyond the domain using a REST interface bridge, all without using or requiring a VPN.

Software Architecture

It should be noted that the present disclosure can be carried out as a method and embodied in a system. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-4 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 5:
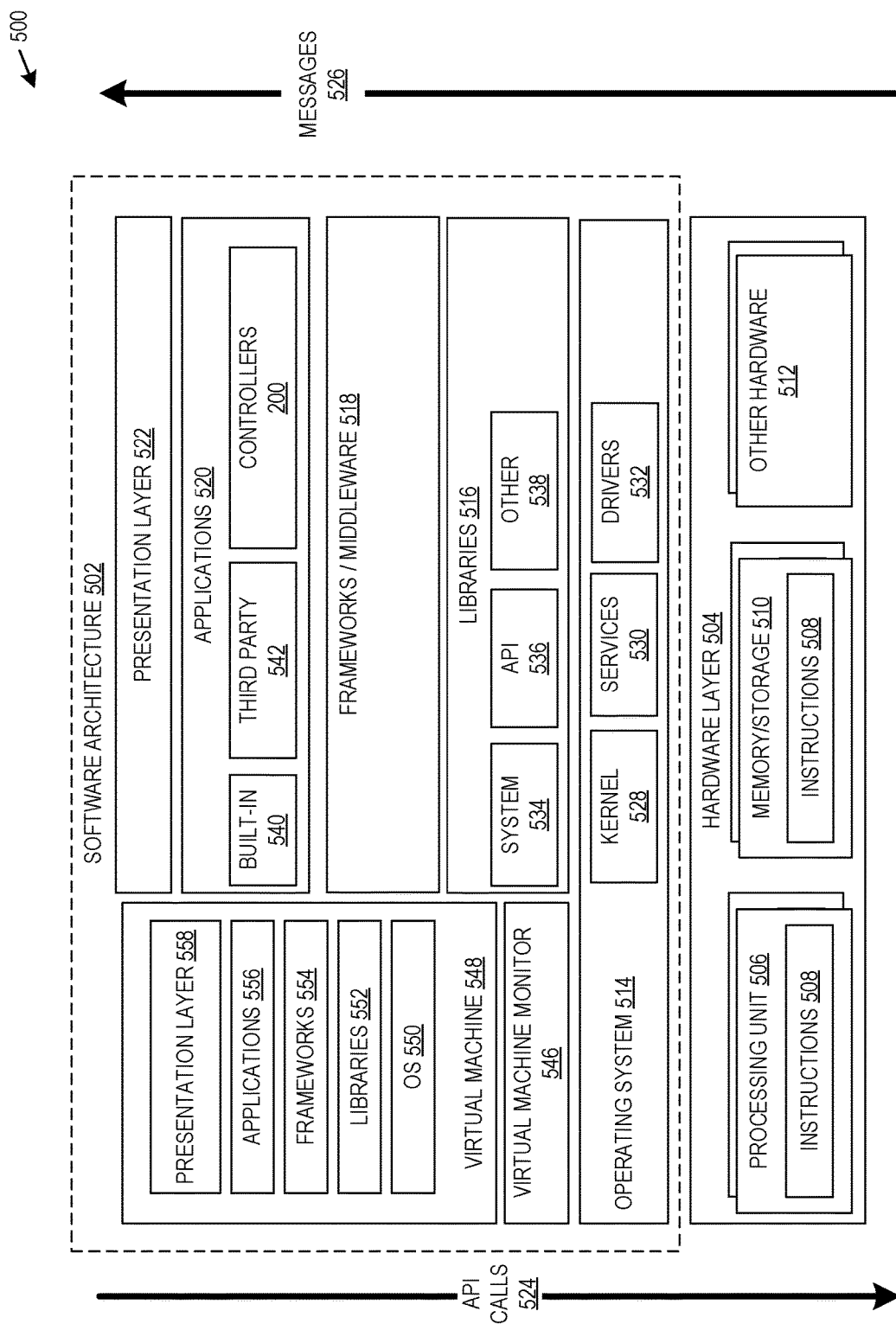
FIG. 5 is a block diagram illustrating a representative software architecture, according to an embodiment.

FIG. 5 is a block diagram 500 illustrating a representative software architecture 502, which may be used in conjunction with various hardware architectures described herein to provide the Active Directory Bridge 100, or any of the various components thereof (e.g., the Agent, Gatekeeper, Gateway), described herein. FIG. 5 is merely a non-limiting example of a software architecture and it will be appreciated that many other architectures may be implemented to facilitate the functionality described herein. The software architecture 502 may be executing on hardware such as machine 1000 of FIG. 10 that includes, among other things, processors 1010, memory 1030, and I/O components 1050. A representative hardware layer 504 is illustrated and can represent, for example, the machine 1000 of FIG. 10. The representative hardware layer 504 comprises one or more processing units 506 having associated executable instructions 508. Executable instructions 508 represent the executable instructions of the software architecture 502, including implementation of the methods, modules and so forth of FIGS. 1-8. Hardware layer 504 also includes memory or storage modules 510, which also have executable instructions 508. Hardware layer 504 may also comprise other hardware as indicated by 512 which represents any other hardware of the hardware layer 504, such as the other hardware illustrated as part of machine 1000.

In the example architecture of FIG. 5, the software 502 may be conceptualized as a stack of layers where each layer provides particular functionality. For example, the software 502 may include layers such as an operating system 514, libraries 516, frameworks/middleware 518, applications 520 and presentation layer 522. Operationally, the applications 520 or other components within the layers may invoke application programming interface (API) calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware layer 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 or other components or layers. The libraries 516 typically provide functionality that allows other software modules to perform tasks in an easier fashion than to interface directly with the underlying operating system 514 functionality (e.g., kernel 528, services 530 or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be used by the applications 520 or other software components/modules. For example, the frameworks 518 may provide various graphic user interface (GUI) functions, high-level resource management, high-level location services, and so forth. The frameworks 518 may provide a broad spectrum of other APIs that may be used by the applications 520 or other software components/modules, some of which may be specific to a particular operating system or platform.

The applications 520 include built-in applications 540 or third-party applications 542. Examples of representative built-in applications 540 may include, but are not limited to, a contacts application, a browser application, a book reader application, a location application, a media application, a messaging application, an endpoint application, one or more controllers, a directory service, Gateway applications, Gatekeeper applications, or a game application. Third party applications may include any of the built-in applications as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 542 may invoke the API calls 524 provided by the mobile operating system such as operating system 514 to facilitate functionality described herein.

The applications 520 may use built in operating system functions (e.g., kernel 528, services 530 or drivers 532), libraries (e.g., system 534, APIs 536, and other libraries 538), frameworks or middleware 518 to create user interfaces to interact with users of the system. Alternatively, or additionally, in some systems interactions with a user may occur through a presentation layer, such as presentation layer 522. In these systems, the application/module "logic" can be separated from the aspects of the application/module that interact with a user.

Some software architectures use virtual machines. In the example of FIG. 5, this is illustrated by virtual machine 548. A virtual machine creates a software environment where applications/modules can execute as if they were executing on a hardware machine (such as the machine of FIG. 10, for example). A virtual machine is hosted by a host operating system (operating system 514 in FIG. 5) and typically, although not always, has a virtual machine monitor 546, which manages the operation of the virtual machine as well as the interface with the host operating system (i.e., operating system 514). A software architecture executes within the virtual machine such as an operating system 550, libraries 552, frameworks/middleware 554, applications 556 or presentation layer 558. These layers of software architecture executing within the virtual machine 548 can be the same as corresponding layers previously described or may be different.

In the example embodiment, controllers operate as an application(s) in the applications 520 layer. However, in some embodiments, the controllers may operate in other software layers, or in multiple software layers (e.g., framework 518 and application 520), or in any architecture that enables the systems and methods as described herein.

Figure 6:
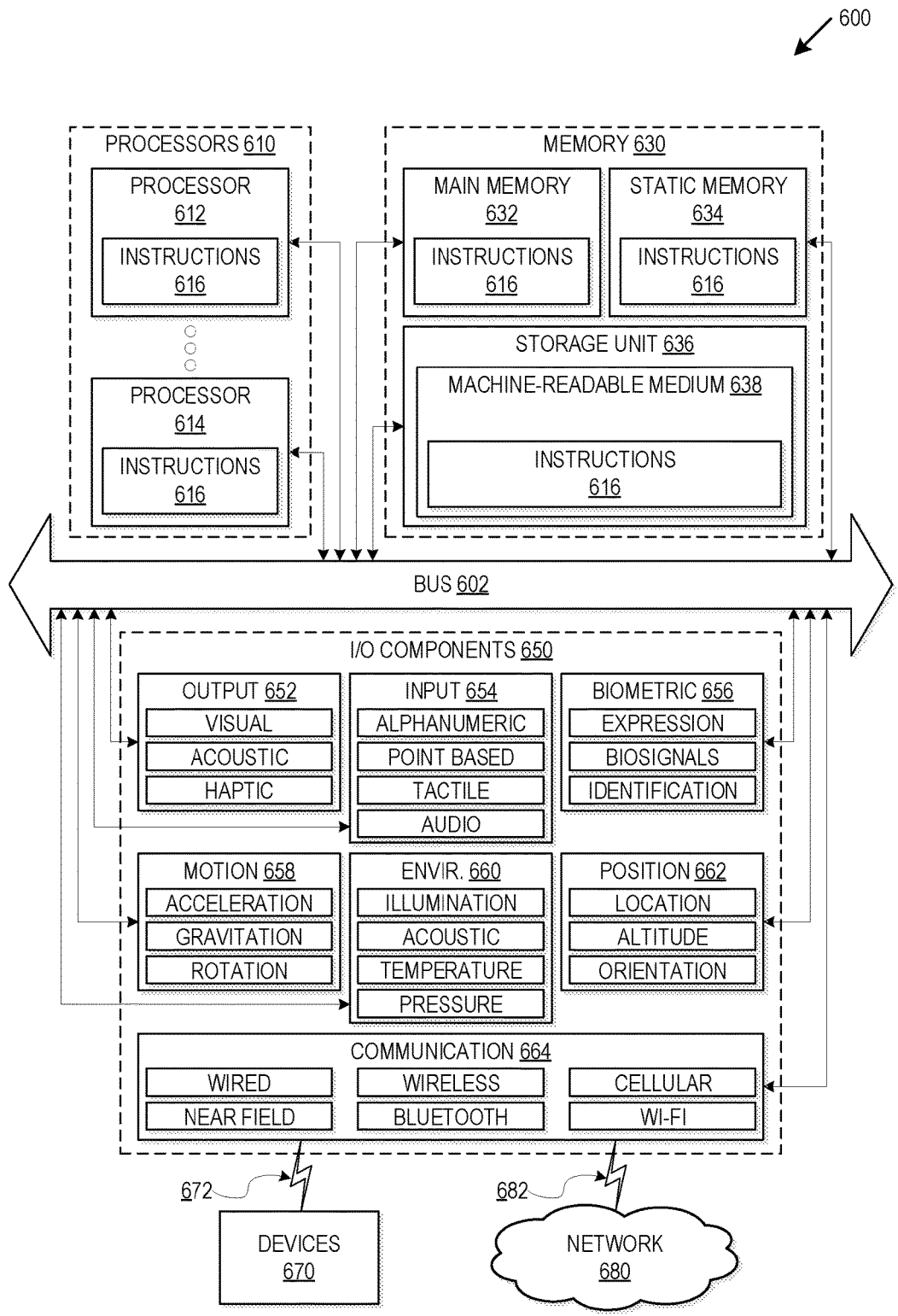
FIG. 6 is a block diagram illustrating components of a machine, according to an embodiment.

FIG. 6 is a block diagram illustrating components of a machine 600, according to an example embodiment, able to read instructions from a machine-readable medium 638 (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), position-sensing components, and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and using any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Example 1 is an Active Directory Bridge Group Policy Object system for managing an external network resource from an internal network, the system comprising: an Active Directory (AD) Bridge Gateway device residing in a first network for managing networked devices via Group Policy Objects, the AD Bridge Gateway device including a memory and a processor; an AD Bridge Gatekeeper device residing in a second network, the second network external to the first network, the AD Bridge Gatekeeper device in networked communication with the AD Bridge Gateway device; and an AD Bridge Agent residing on an external network resource in a third network, the third network external to the second network and to the first network, the external network resource unable to directly join the first network; wherein the AD Bridge Gateway device processor is configured to: connect the external network resource to the AD Bridge Gateway device in the first network; generate a Group Policy Object for the external network resource, the Group Policy Object including a configuration change for the external network resource; and send the Group Policy Object to the external network resource to apply the configuration change to the external network resource.

In Example 2, the subject matter of Example 1 optionally includes wherein: the AD Bridge Gatekeeper Device includes a Group Policy controller; and the AD Bridge Gateway device provides the Group Policy Object through the Group Policy controller to the AD Bridge Agent on the external network resource.

In Example 3, the subject matter of any one or more of Examples 1-2 optionally include wherein the AD Bridge Gateway device processor is further configured to: receive an external network resource policy, the external network resource policy including data representative of Group Policy Object policies applied by the external network resource; and verify the external network resource policy implements the Group Policy Object.

In Example 4, the subject matter of any one or more of Examples 1-3 optionally include wherein the AD Bridge Gateway device includes a software as a service provider to provide the Group Policy Object to the AD Bridge Gateway device.

In Example 5, the subject matter of any one or more of Examples 1-4 optionally include wherein the AD Bridge Gateway device includes at least one of an Internet of Things device, a Software-as-a-Service application, a cloud-hosted virtual machine, and a cloud-hosted computer.

In Example 6, the subject matter of any one or more of Examples 1-5 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 7, the subject matter of Example 6 optionally includes wherein the first network boundary includes a network perimeter device to prohibit at least a portion of network traffic traversing the first network boundary.

In Example 8, the subject matter of Example 7 optionally includes wherein the second network includes a perimeter network associated with the first network.

In Example 9, the subject matter of any one or more of Examples 7-8 optionally include wherein: the AD Bridge Gatekeeper device includes a cloud-based device; and the second network includes a cloud-based network.

In Example 10, the subject matter of any one or more of Examples 6-9 optionally include wherein the AD Bridge Gatekeeper device is in networked communication with the AD Bridge Gateway device without requiring a virtual private network.

In Example 11, the subject matter of any one or more of Examples 1-10 optionally include wherein the external network resource includes at least one of an Internet of Things device, a Software-as-a-Service application, a cloud-hosted virtual machine, and a cloud-hosted computer.

Example 12 is an Active Directory Bridge Group Policy Object method for managing an external network resource from an internal network, the method comprising: connecting an Active Directory (AD) Bridge Agent on an external network resource through an AD Bridge Gatekeeper to an AD Bridge Gateway device; generating a Group Policy Object for the external network resource, the Group Policy Object including a configuration change for the external network resource; and sending the Group Policy Object to the external network resource to apply the configuration change to the external network resource; wherein: the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides on the external network resource in a third network, the third network external to the second network and to the first network, the external network resource unable to directly join the first network.

In Example 13, the subject matter of Example 12 optionally includes wherein: the AD Bridge Gatekeeper Device includes a Group Policy controller; and the AD Bridge Gateway device provides the Group Policy Object through the Group Policy controller to the AD Bridge Agent on the external network resource.

In Example 14, the subject matter of any one or more of Examples 12-13 optionally include receiving an external network resource policy, the external network resource policy including data representative of Group Policy Object policies applied by the external network resource; and verifying the external network resource policy implements the Group Policy Object.

In Example 15, the subject matter of any one or more of Examples 12-14 optionally include wherein the AD Bridge Gateway device includes a software as a service provider to provide the Group Policy Object to the AD Bridge Gateway device.

In Example 16, the subject matter of any one or more of Examples 12-15 optionally include wherein the AD Bridge Gateway device includes at least one of an Internet of Things device, a Software-as-a-Service application, a cloud-hosted virtual machine, and a cloud-hosted computer.

In Example 17, the subject matter of any one or more of Examples 12-16 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 18, the subject matter of Example 17 optionally includes wherein the first network boundary includes a network perimeter device to prohibit at least a portion of network traffic traversing the first network boundary.

In Example 19, the subject matter of Example 18 optionally includes wherein the second network includes a perimeter network associated with the first network.

In Example 20, the subject matter of any one or more of Examples 18-19 optionally include wherein: the AD Bridge Gatekeeper device includes a cloud-based device; and the second network includes a cloud-based network.

In Example 21, the subject matter of any one or more of Examples 17-20 optionally include wherein the AD Bridge Gatekeeper device is in networked communication with the AD Bridge Gateway device without requiring a virtual private network.

In Example 22, the subject matter of any one or more of Examples 12-21 optionally include wherein the external network resource includes at least one of an Internet of Things device, a Software-as-a-Service application, a cloud-hosted virtual machine, and a cloud-hosted computer.

Example 23 is one or more machine-readable medium including instructions, which when executed by a computing system, cause the computing system to perform any of the methods of Examples 12-22.

Example 24 is an apparatus comprising means for performing any of the methods of Examples 12-22.

Example 25 is at least one non-transitory machine-readable storage medium, comprising a plurality of instructions that, responsive to being executed with processor circuitry of a computer-controlled device, cause the computer-controlled device to: connect an Active Directory (AD) Bridge Agent on an external network resource through an AD Bridge Gatekeeper to an AD Bridge Gateway device; generate a Group Policy Object for the external network resource, the Group Policy Object including a configuration change for the external network resource; and send the Group Policy Object to the external network resource to apply the configuration change to the external network resource; wherein: the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides on the external network resource in a third network, the third network external to the second network and to the first network, the external network resource unable to directly join the first network.

In Example 26, the subject matter of Example 25 optionally includes wherein: the AD Bridge Gatekeeper Device includes a Group Policy controller; and the AD Bridge Gateway device provides the Group Policy Object through the Group Policy controller to the AD Bridge Agent on the external network resource.

In Example 27, the subject matter of any one or more of Examples 25-26 optionally include the instructions further causing the computer-controlled device to: receive an external network resource policy, the external network resource policy including data representative of Group Policy Object policies applied by the external network resource; and verify the external network resource policy implements the Group Policy Object.

In Example 28, the subject matter of any one or more of Examples 25-27 optionally include wherein the AD Bridge Gateway device includes a software as a service provider to provide the Group Policy Object to the AD Bridge Gateway device.

In Example 29, the subject matter of any one or more of Examples 25-28 optionally include wherein the AD Bridge Gateway device includes at least one of an Internet of Things device, a Software-as-a-Service application, a cloud-hosted virtual machine, and a cloud-hosted computer.

In Example 30, the subject matter of any one or more of Examples 25-29 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 31, the subject matter of Example 30 optionally includes wherein the first network boundary includes a network perimeter device to prohibit at least a portion of network traffic traversing the first network boundary.

In Example 32, the subject matter of Example 31 optionally includes wherein the second network includes a perimeter network associated with the first network.

In Example 33, the subject matter of any one or more of Examples 31-32 optionally include wherein: the AD Bridge Gatekeeper device includes a cloud-based device; and the second network includes a cloud-based network.

In Example 34, the subject matter of any one or more of Examples 30-33 optionally include wherein the AD Bridge Gatekeeper device is in networked communication with the AD Bridge Gateway device without requiring a virtual private network.

In Example 35, the subject matter of any one or more of Examples 25-34 optionally include wherein the external network resource includes at least one of an Internet of Things device, a Software-as-a-Service application, a cloud-hosted virtual machine, and a cloud-hosted computer.

Example 36 is an Active Directory Bridge Group Policy Object apparatus for managing an external network resource from an internal network, the apparatus comprising: means for connecting an Active Directory (AD) Bridge Agent on an external network resource through an AD Bridge Gatekeeper to an AD Bridge Gateway device; means for generating a Group Policy Object for the external network resource, the Group Policy Object including a configuration change for the external network resource; and means for sending the Group Policy Object to the external network resource to apply the configuration change to the external network resource; wherein: the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides on the external network resource in a third network, the third network external to the second network and to the first network, the external network resource unable to directly join the first network.

In Example 37, the subject matter of Example 36 optionally includes wherein: the AD Bridge Gatekeeper Device includes a Group Policy controller; and the AD Bridge Gateway device provides the Group Policy Object through the Group Policy controller to the AD Bridge Agent on the external network resource.

In Example 38, the subject matter of any one or more of Examples 36-37 optionally include means for receiving an external network resource policy, the external network resource policy including data representative of Group Policy Object policies applied by the external network resource; and means for verifying the external network resource policy implements the Group Policy Object.

In Example 39, the subject matter of any one or more of Examples 36-38 optionally include wherein the AD Bridge Gateway device includes a software as a service provider to provide the Group Policy Object to the AD Bridge Gateway device.

In Example 40, the subject matter of any one or more of Examples 36-39 optionally include wherein the AD Bridge Gateway device includes at least one of an Internet of Things device, a Software-as-a-Service application, a cloud-hosted virtual machine, and a cloud-hosted computer.

In Example 41, the subject matter of any one or more of Examples 36-40 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 42, the subject matter of Example 41 optionally includes wherein the first network boundary includes a network perimeter device to prohibit at least a portion of network traffic traversing the first network boundary.

In Example 43, the subject matter of Example 42 optionally includes wherein the second network includes a perimeter network associated with the first network.

In Example 44, the subject matter of any one or more of Examples 42-43 optionally include wherein: the AD Bridge Gatekeeper device includes a cloud-based device; and the second network includes a cloud-based network.

In Example 45, the subject matter of any one or more of Examples 41-44 optionally include wherein the AD Bridge Gatekeeper device is in networked communication with the AD Bridge Gateway device without requiring a virtual private network.

In Example 46, the subject matter of any one or more of Examples 36-45 optionally include wherein the external network resource includes at least one of an Internet of Things device, a Software-as-a-Service application, a cloud-hosted virtual machine, and a cloud-hosted computer.

Example 47 is one or more non-transitory machine-readable medium including instructions, which when executed by a machine, cause the machine to perform operations of any of the operations of Examples 1-46.

Example 48 is an apparatus comprising means for performing any of the operations of Examples 1-46.

Example 49 is a system to perform the operations of any of the Examples 1-46.

Example 50 is a method to perform the operations of any of the Examples 1-46.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An Active Directory Bridge Group Policy Object system for managing an external network resource from an internal network, the system comprising:
    an Active Directory (AD) Bridge Gateway device residing in a first network for managing networked devices via Group Policy Objects, the AD Bridge Gateway device including a memory and a processor;
    an AD Bridge Gatekeeper device residing in a second network, the second network external to the first network, the AD Bridge Gatekeeper device in networked communication with the AD Bridge Gateway device; and
    an AD Bridge Agent residing on an external network resource in a third network, the third network external to the second network and to the first network, the external network resource unable to directly join the first network;
    wherein the AD Bridge Gateway device processor is configured to:
        connect the external network resource to the AD Bridge Gateway device in the first network;
        generate a Group Policy Object for the external network resource, the Group Policy Object including a configuration change for the external network resource; and
        send the Group Policy Object to the external network resource to apply the configuration change to the external network resource; and
    wherein:
        the AD Bridge Gatekeeper device is in networked communication with the AD Bridge Gateway device through a first network boundary;

the AD Bridge Agent is in networked communication with the AD Bridge Gatekeeper device through a second network boundary; and the first network boundary provides greater network security than the second network boundary.

2. The system of claim 1, wherein:

the AD Bridge Gatekeeper Device includes a Group Policy controller; and the AD Bridge Gateway device provides the Group Policy Object through the Group Policy controller to the AD Bridge Agent on the external network resource.

3. The system of claim 1, wherein the AD Bridge Gateway device processor is further configured to:

receive an external network resource policy, the external network resource policy including data representative of Group Policy Object policies applied by the external network resource; and verify the external network resource policy implements the Group Policy Object.

4. The system of claim 1, wherein the AD Bridge Gateway device includes a software as a service provider to provide the Group Policy Object to the AD Bridge Gateway device.

5. The system of claim 1, wherein the AD Bridge Gateway device includes at least one of an Internet of Things device, a Software-as-a-Service application, a cloud-hosted virtual machine, and a cloud-hosted computer.

6. The system of claim 1, wherein the first network boundary includes a network perimeter device to prohibit at least a portion of network traffic traversing the first network boundary.

7. An Active Directory Bridge Group Policy Object method for managing an external network resource from an internal network, the method comprising:

connecting an Active Directory (AD) Bridge Agent on an external network resource through an AD Bridge Gatekeeper to an AD Bridge Gateway device, the AD Bridge Gateway device residing in a first network, the external network resource unable to directly join the first network, the AD Bridge Gatekeeper device residing in a second network external to the first network, the AD Bridge Gatekeeper device in networked communication with the AD Bridge Gateway device through a first network boundary, the AD Bridge Agent residing on the external network resource in a third network external to the second network and to the first network, the AD Bridge Agent in networked communication with the AD Bridge Gatekeeper device through a second network boundary, the first network boundary providing greater network security than the second network boundary;

generating a Group Policy Object for the external network resource, the Group Policy Object including a configuration change for the external network resource; and sending the Group Policy Object to the external network resource to apply the configuration change to the external network resource.

8. The method of claim 7, wherein:

the AD Bridge Gatekeeper Device includes a Group Policy controller; and the AD Bridge Gateway device provides the Group Policy Object through the Group Policy controller to the AD Bridge Agent on the external network resource.

9. The method of claim 7, further including:

receiving an external network resource policy, the external network resource policy including data representative of Group Policy Object policies applied by the external network resource; and verifying the external network resource policy implements the Group Policy Object.

10. The method of claim 7, wherein the AD Bridge Gateway device includes a software as a service provider to provide the Group Policy Object to the AD Bridge Gateway device.

11. The method of claim 7, wherein the AD Bridge Gateway device includes at least one of an Internet of Things device, a Software-as-a-Service application, a cloud-hosted virtual machine, and a cloud-hosted computer.

12. The method of claim 7 wherein the first network boundary includes a network perimeter device to prohibit at least a portion of network traffic traversing the first network boundary.

13. At least one non-transitory machine-readable storage medium, comprising a plurality of instructions that, responsive to being executed with processor circuitry of a computer-controlled device, cause the computer-controlled device to:

connect an Active Directory (AD) Bridge Agent on an external network resource through an AD Bridge Gatekeeper to an AD Bridge Gateway device, the AD Bridge Gateway device residing in a first network, the external network resource unable to directly join the first network, the AD Bridge Gatekeeper device residing in a second network external to the first network, the AD Bridge Gatekeeper device in networked communication with the AD Bridge Gateway device through a first network boundary, the AD Bridge Agent residing on the external network resource in a third network external to the second network and to the first network, the AD Bridge Agent in networked communication with the AD Bridge Gatekeeper device through a second network boundary, the first network boundary providing greater network security than the second network boundary;

generate a Group Policy Object for the external network resource, the Group Policy Object including a configuration change for the external network resource; and send the Group Policy Object to the external network resource to apply the configuration change to the external network resource.

14. The non-transitory machine-readable storage medium of claim 13, wherein:

the AD Bridge Gatekeeper Device includes a Group Policy controller; and the AD Bridge Gateway device provides the Group Policy Object through the Group Policy controller to the AD Bridge Agent on the external network resource.

15. The non-transitory machine-readable storage medium of claim 13, the instructions further causing the computer-controlled device to:

receive an external network resource policy, the external network resource policy including data representative of Group Policy Object policies applied by the external network resource; and verify the external network resource policy implements the Group Policy Object.

16. The non-transitory machine-readable storage medium of claim 13, wherein the AD Bridge Gateway device includes a software as a service provider to provide the Group Policy Object to the AD Bridge Gateway device.

17. The non-transitory machine-readable storage medium of claim 13, wherein the AD Bridge Gateway device includes at least one of an Internet of Things device, a Software-as-a-Service application, a cloud-hosted virtual machine, and a cloud-hosted computer.

\* \* \* \* \*